Aug. 17, 1965 E. S. PLONSKI 3,201,004

POWDERED COFFEE DISPENSER

Filed July 31, 1961

INVENTOR
EDWARD S. PLONSKI

BY *Gardner J. O'Boyle*

ATTORNEY

United States Patent Office 3,201,004
Patented Aug. 17, 1965

3,201,004
POWDERED COFFEE DISPENSER
Edward S. Plonski, 291 W. Washington St.,
Forestville, Conn.
Filed July 31, 1961, Ser. No. 128,936
4 Claims. (Cl. 222—228)

This invention relates to dispensing devices and more particularly to a device for dispensing powders of the character used in making instant coffee, tea and cocoa.

An object of my invention is to provide an improved dispensing device for use with containers of powdered materials, wherein means are provided for dispensing a predetermined quantity of material from the container.

Another object of my invention is to provide an improved dispensing device having an adjustable measuring compartment adapted to dispense a predetermined quantity of a comminuted, granular or powdered material from a receptacle containing such material.

Yet another object of my invention is to provide an improved dispensing device having unitary control means for varying the size of the measuring compartment and dispensing a predetermined quantity of a comminuted, granular or powdered material from an associated container of such material.

Still another object of my invention is an improved dispensing device for use with containers of powdered material, wherein the volume of the measuring compartment may be increased or decreased by outward or inward movement, respectively, of the dispenser operating lever, and the selected volume of powdered material dispensed from the container by oscillation of the dispenser operating lever.

Yet still another object of my invention is to provide an improved dispensing device having means for agitating the material to be dispensed, prior to feeding the material into the measuring compartment of the device.

A further object of my invention is to provide an improved dispensing device which is strong and rugged in construction, easily assembled and disassembled for purposes of cleaning and inspection, and not liable to get out of order even after long and continued use.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular construction which, for the purpose of explanation, have been made the subject of illustration.

Figure 1:
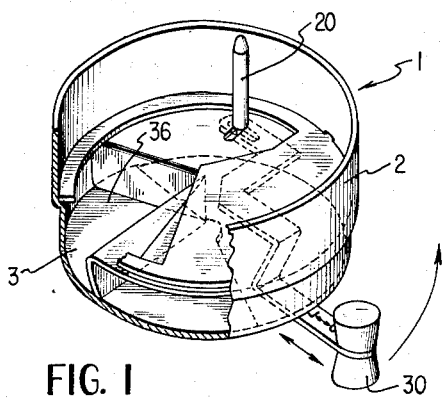
FIG. 1 is a perspective view, partly in section, of the dispensing device of the present invention.
Figure 2:
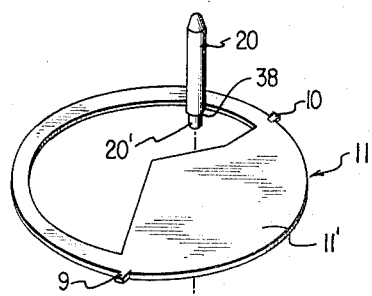
FIG. 2 is an exploded view, showing the various components of the dispensing device of FIG. 1.

Referring to the drawings, and more particularly to FIGS. 1 and 2, the dispensing device 1 comprises a unitary housing 2, having a partial bottom closure 3, and integral bracket means 4 for mounting the device on a complementary wall bracket, not shown. The housing 2 is provided with an opening 6 and an indentation 7 adapted to receive projections 9 and 10, respectively, of a retaining plate 11, and is further provided with a relatively short protuberance 12 adapted for engagement with the threaded neck or collar portion 13 of a container 14 (FIG. 3), as will be described more fully hereinafter.

A disc 15, having a quadrant shaped opening 16, and a depending flange 17 adjacent an edge 18 of the opening, is formed with a slot 19 to permit sliding movement of a pin or stud 20 (FIG. 2) therein, the axis of the slot being perpendicular to the edge 18 of the opening. The disc is also formed with a rectangular shaped cutout 21, defined by a rear wall 22 and downwardly extending flanges 23, said flanges having opposed, inwardly extending projections 24, adapted to slidably support an operating lever 25, comprising coplanar, angularly disposed sections 26, 27 and 28, and a depending parallel section 29, having a finger engaging actuator 30 secured thereto, section 28 of the lever being adapted to be slidably mounted on the projections 24 when the dispenser is assembled, to be described more fully hereinafter.

A second disc 31, of diameter equal to the diameter of the disc 15, is formed with a quadrant shaped opening 32, a depending flange 33 of the same dimensions as the flange 17 of disc 15, and a slot 34 similar to the oblong shaped slot 19 of disc 15. It will be noted that the depending flange 33 is adjacent an edge 35 of the opening 32, and that the axis of the slot 34 is perpendicular to the edge 35 of the opening. Accordingly, when the disc 31 is placed on the disc 15, in coinciding relationship therewith, and the discs are positioned within the housing 2, (FIG. 1) the flanges 17 and 33 are at right angles and define with the partial bottom closure 3, an adjustable measuring compartment, designated generally by numeral 36.

The discs 15 and 31 are maintained in frictional sliding engagement, and the operating lever 25 is connected to the disc 15, by means of the stud or pin 20. As will be seen in FIG. 2, the lower end portion 20' of the stud is of reduced diameter, approximately equal to the width of the slots 19 and 34, said end portion being insertable through the slots and the opening 37 formed in the vicinity of the end of section 26 of the operating lever, the bottom end of the stud being peened or otherwise secured to the section 26 of the operating lever to thereby restrain the discs against vertical movement. It will thus be seen that when the discs are in assembled position (FIG. 1) the peripheral shoulder 38 of the stud prevents upward movement of the disc 31 with respect to the stud, and the arrangement of the slots 19 and 34 enables sections 28 and 29 of the operating lever to be radially reciprocated, and thereby adjust the size of the measuring compartment.

In connection with the adjustment of the size of the measuring compartment, it will be observed that when the actuator arm 29 is moved radially inward of the dispenser casing, the upper disc 31 is partially rotated in a counterclockwise direction, as viewed in FIG. 1, by reason of the cooperative engagement of the reduced end portion 20' of the stud with the sides of the slots 19 and 34, thus decreasing the size of the measuring compartment. Reverse movement of the actuator arm, that is to say, radially outward of the casing, causes the disc 31 to be partially rotated in a clockwise direction, thereby increasing the size of the measuring compartment.

After the discs 15 and 31, and the lever 25, have been assembled and positioned in the dispenser casing, as described hereinabove, they are retained in operative position by means of the plate 11, adapted to rest on the interior shoulder or ledge 39 of the casing, when the projections 9 and 10 of the plate are brought into snap-fitting, seated engagement with the opening 6 and the indentation 7, respectively, of the wall of the casing. When plate 11 is thus positioned, and the operating lever 25 is moved in the direction of the arrow (FIG. 1) to partially rotate the discs 15 and 31 and bring the flanges 17 and 33 beneath the web portion 11', the measuring compartment inlet is covered by said web portion. During such movement of the operating lever, the lower edges of the flanges 17 and 33, defining the side walls of the measuring compartment, move out of contact with the upper surface of the bottom closure member 3 of the dispenser housing, and over the opening 40 of the housing.

It will thus be seen that when the dispenser elements are positioned as shown in FIG. 1, the measuring compartment inlet is open, whereby the powder to be dispensed, for example coffee, may flow under the influence of gravity from the container 14 (FIG. 3) into the compartment and fill the same. Upon movement of the operating lever 25, to the right, as viewed in FIG. 1, the coffee is carried along by and between the flanges 17 and 33 until the lower edge of the leading flange 17 clears the upper surface of the closure 3; whereupon, flow of the coffee from the compartment is initiated, said flow continuing until the lower edge of flange 33 clears the closure, at which time the inlet opening of the compartment is completely covered by the web portion 11' of the retaining disc.

Figure 3:
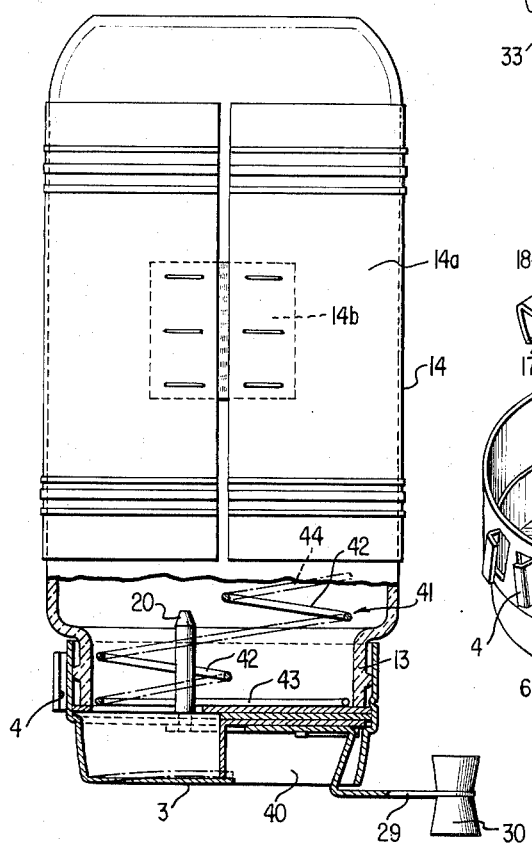
FIG. 3 is a side elevational view, partly in section, of the dispensing device of FIG. 1, together with an associated container for the material to be dispensed.

In view of the fact that the discs 15 and 31 are supported in frictional sliding engagement, as previously described, it will be appreciated that any undue pressure on the discs will interfere with their normal operation. Accordingly, in order to prevent excess pressure on the discs when the threaded neck portion of the coffee jar is screwed down into the dispenser housing, the interior circumferential flange or bead 39 of the housing is located a predetermined distance below the upper rim thereof, so that the retaining plate 11 will rest on the flange and remain out of pressure-contact with the disc 15, when the dispenser is secured to a coffee jar or other container. It will be further appreciated that while any significant pressure on the discs must be relieved, it is highly desirable to maintain a substantially air-tight seal between the lower edges of the flanges 17 and 33, while they are in contact with the bottom closure 3, and a like seal between the retaining plate and the upper disc, in order to minimize leakage of the powdered material being dispensed. To accomplish this, the bottom partial closure 3 of the housing or shell 2 is slightly concave, about 0.03" at the highest point, as shown in the dotted line position (FIG. 3). When the dispenser is secured in operative position on a jar, as shown in FIG. 3, the concave portion of the closure flattens out and acts as a spring, to maintain a constant pressure on the discs against the plate.

Certain brands of coffee, and other powdered materials, particularly cocoa, require agitation to insure smooth flow from the container. After considerable research and experimentation I have found that the adhering powder particles can be quickly and easily separated by means of an agitator device, comprising a coil spring 41 (FIG. 3), the convolutions 42 being laterally offset, as shown. The bottom convolution 43 is secured to the stud 20, the upper terminal loop 44 of the spring extending into the container. When the lever 29 is oscillated or reciprocated in connection with the dispensing and measuring operations, respectively, it will be apparent that the coil spring 41 will oscillate or reciprocate with the stud 20, and by reason of the offset arrangement of the convolutions a high degree of agitation of the material is effected. It will be further noted that the material is agitated in a series of spaced horizontal planes, and in addition to the rotary stirring motion of the convolutions, they are also free to move vertically when subjected to the reactive resistance of any relatively compact powdered material which may be encountered.

In using the device for dispensing coffee, for example, and assuming that the dispenser elements are in the assembled position of FIG. 1, the agitator 41 is positioned on the stud 20, the dispensing device is attached to the container 14 of powdered coffee by turning the device on the threaded collar 13 of the container, until the peripheral portion of the collar seats on the retaining plate 11, and the dispenser, with the attached container, is then mounted on a suitable wall bracket, not shown, by means of the member 4, secured to the housing 2 (FIG. 2) of the dispenser. When it is desired to dispense coffee from the container, the actuator arm is moved inwardly or outwardly to decrease or increase, respectively, the size of the measuring compartment 36, and the selected amount of coffee, which flows under the influence of gravity into the measuring compartment, is discharged into a cup or other suitable container, by moving the operating lever 25, to the right, as viewed in FIG. 1. It will be noted that when the coffee begins to flow from the measuring compartment, it continues to flow until the lower edge of the flange 33 clears the bottom partial closure member 3, at which time the inlet to the compartment is covered by the web portion 11' of the retaining disc. Upon completion of the discharge of the selected amount of coffee, the actuating lever 25 is moved to its initial position, that is to say, to the position in which the inlet opening of the measuring compartment is uncovered, and the dispensing procedure is repeated.

The improved dispensing device of the present invention is adapted for threaded engagement with any standard quart jar, or with a six ounce instant coffee jar. When used with the coffee container, if desired, a decorative plastic sleeve 14a (FIG. 3) can be positioned over the jar and retained in frictional engagement therewith by means of a piece of elastic material 14b, secured to the marginal edge portions of the sleeve.

One of the important features of the dispenser is the ease with which it can be disassembled for cleaning and inspection purposes; and thereafter readily assembled without the use of any special tools. In this connection, it will be observed that when the operating lever 25 is moved to the extreme right, as viewed in FIG. 1, the retaining plate 11 can be removed from its seated position in the housing 2 by inserting the index finger in the opening 40, defined by the partial bottom closure and the wall of the housing, and pushing upwards.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A coffee dispensing device of the character described, comprising a cylindrical shaped housing having a container receiving portion at one end thereof and a discharge portion of reduced diameter at its opposite end, said discharge portion defining an inner peripheral flange at its line of juncture with the container receiving portion, and having a partial bottom closure member, a first disc having a quadrant-shaped opening and a depending flange adjacent one edge of the opening, a second disc of diameter equal to the diameter of said first disc, concentric therewith and superposed thereon, said second disc having a quadrant-shaped opening and a depending flange adjacent one edge of the opening, the depending flanges of the discs defining, in conjunction with the partial bottom closure member of the housing, a compartment for the coffee to be dispensed, a circular-shaped retaining plate seated on the inner peripheral flange at the juncture of the container receiving portion and the discharge portion of the dispenser, said retaining plate maintaining said first and second disc in an operative superposed, sliding position, and an actuating arm linearly slidably mounted on the first disc and extending outwardly therefrom, means carried by said first disc for constraining the sliding movement of the actuating arm to a linear direction with respect to the disc, said actuating arm being operatively connected to the second disc, whereby the size of the measuring compartment may be varied by moving the actuating arm linearly with respect to the housing, said actuating arm being movable in a curvilinear path with respect to the housing to move the measuring compartment to discharge position with respect to the partial bottom closure of the discharge portion of the dispenser.

2. A coffee dispensing device in accordance with claim 1, wherein each of the discs is provided with an elongated slot, said slot being offset from the center of the disc, the slots overlapping at right angles when the discs are concentrically arranged, and pin means inserted through the registering portions of the elongated slots, one end of said actuating arm being secured to the pin means, whereby upon movement of the pin longitudinally of the slot formed in the first disc, the second disc is oscillated and the size of the measuring compartment is varied.

3. A coffee dispensing device, in accordance with claim 1, wherein the bottom partial closure member is slightly concave, whereby when the dispenser is secured in the operative position on a coffee jar, the concave portion of the closure member is flattened and maintains a constant pressure on the disc against the retaining plate.

4. A coffee dispensing device, in accordance with claim 2, wherein a coffee agitating device is provided, comprising a coil spring having a plurality of convolutions of different radii, the end of the convolution of largest radius being connected to the pin means, the free end of the convolution at the opposite end of the spring projecting a substantial distance above the plane of the periphery of the container receiving portion of the dispenser, whereby upon movement of the pin longitudinally of the slot in the first disc, the agitating device is oscillated.

References Cited by the Examiner
UNITED STATES PATENTS

| | | | |
|---|---|---|---|
| 1,219,651 | 3/17 | McDonald et al. | 222—305 X |
| 1,989,221 | 1/35 | Westwood et al. | 222—293 |
| 2,199,065 | 4/40 | Bell. | |
| 2,239,966 | 4/41 | Johnson | 222—294 X |
| 2,584,781 | 2/52 | Beatty. | |

EVERETT W. KIRBY, *Primary Examiner.*

LOUIS J. DEMBO, *Examiner.*